United States Patent [19]

Jacob et al.

[11] 4,228,692
[45] Oct. 21, 1980

[54] ENDLESS POWER TRANSMISSION BELT AND METHOD OF MANUFACTURE

[75] Inventors: Richard J. Jacob, Dayton; Dale L. Waugh, Springfield, both of Ohio

[73] Assignee: Dayco Corporation, Dayton, Ohio

[21] Appl. No.: 824,579

[22] Filed: Aug. 15, 1977

[51] Int. Cl.³ .............................................. F16G 1/00
[52] U.S. Cl. .................................... 474/251; 156/139; 474/263; 474/271
[58] Field of Search .......... 74/231 R, 231 C, 231 CB, 74/232, 233, 234; 156/137, 138, 139, 140, 141, 142; 428/294, 295; 264/46.9

[56] References Cited

U.S. PATENT DOCUMENTS

| | | | |
|---|---|---|---|
| 1,890,080 | 12/1932 | Freedlander | 74/233 |
| 2,059,207 | 11/1936 | Catt | 74/231 R |
| 2,121,222 | 6/1938 | Freedlander | 74/233 |
| 2,124,668 | 7/1938 | Freedlander | 74/233 |
| 2,167,384 | 7/1939 | Freedlander | 74/237 |
| 2,211,202 | 8/1940 | Freedlander | 74/237 |
| 2,268,865 | 1/1942 | Freedlander | 156/138 |
| 2,430,500 | 11/1947 | Freedlander et al. | 74/233 |
| 2,514,429 | 7/1950 | Waugh | 74/232 |
| 2,631,463 | 3/1953 | Waugh | 74/232 |
| 2,699,685 | 1/1955 | Waugh | 74/233 |
| 2,724,278 | 11/1955 | Murray | 74/233 |
| 2,802,511 | 8/1957 | Waugh | 74/231 R |
| 3,078,205 | 2/1963 | Sauer et al. | 74/237 |
| 3,078,206 | 2/1963 | Skura | 74/237 |
| 3,673,883 | 7/1972 | Adams | 156/142 |
| 3,866,483 | 2/1975 | Smith | 74/237 |
| 3,968,703 | 7/1976 | Bellmann | 74/231 C |
| 3,987,684 | 10/1976 | Fisher et al. | 156/142 |
| 4,024,773 | 5/1977 | Hartman et al. | 74/233 |

*Primary Examiner*—Samuel Scott
*Assistant Examiner*—Randall L. Green
*Attorney, Agent, or Firm*—Reuben Wolk; Charles E. Bricker

[57] ABSTRACT

An endless power transmission belt having a compression section, a load-carrying section and a tension section, comprising a plurality of layers of rubber-impregnated fabric having transverse corrugations molded therein to provide a belt having increased transverse rigidity.

20 Claims, 5 Drawing Figures

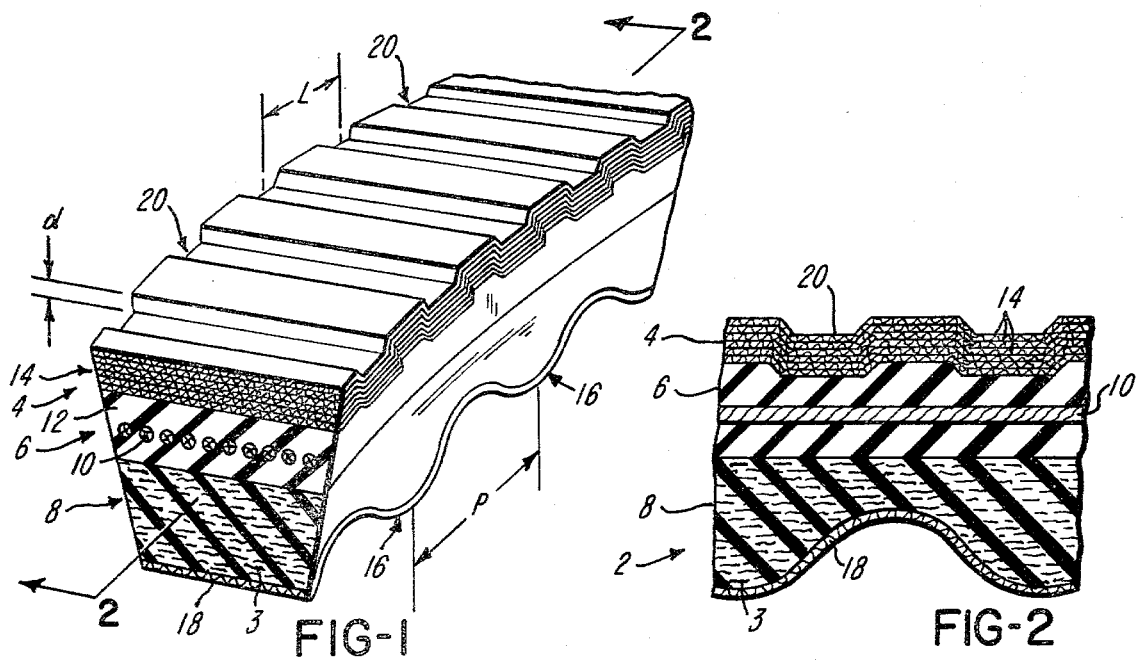
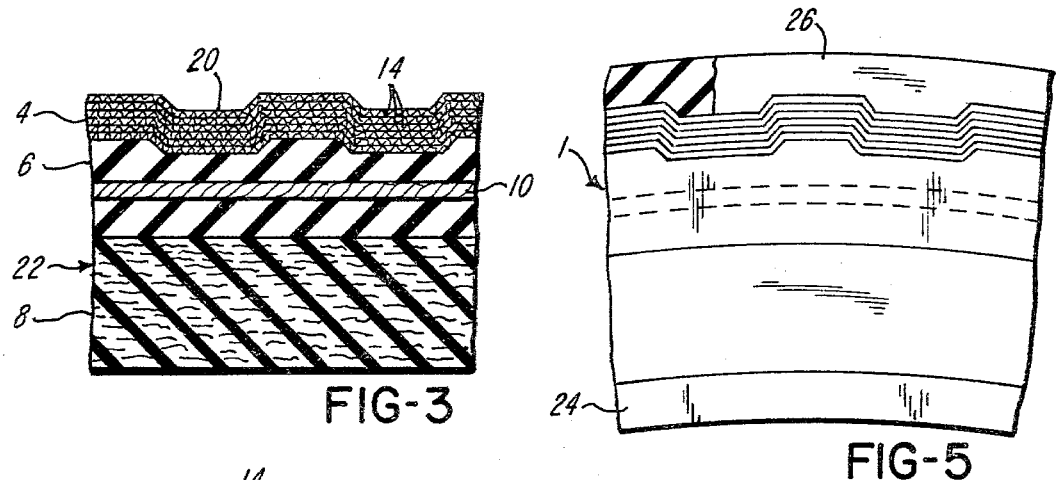
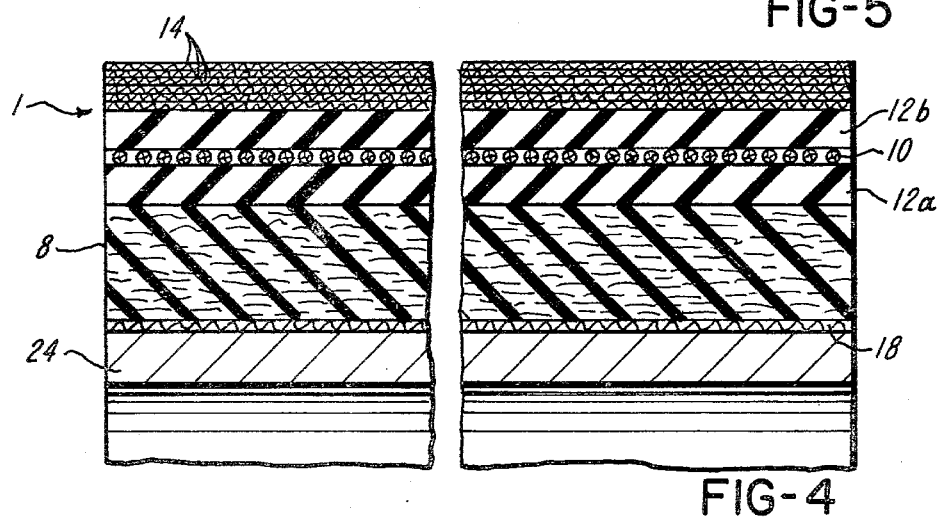

ENDLESS POWER TRANSMISSION BELT AND METHOD OF MANUFACTURE

BACKGROUND OF THE INVENTION

This invention relates to endless V-type power transmission belts.

Endless power transmission belts made primarily of elastomeric materials and including toothed or cogged compression sections, are in wide use throughout industry. It is a problem with all of such belts to provide sufficient rigidity transverse of the endless path in which it operates, in order to prevent belt turnover, while enabling the belt to be operated in sheaves or pulleys of minimum diameters.

Many belt constructions have been proposed heretofore for increasing the transverse rigidity of conventional as well as toothed V-Belts; however, these previously proposed constructions often result in a belt which is more expensive or which has a greater thickness than necessary. It has been found that thicker belts are more difficult to operate in comparatively small diameter sheaves or pulleys and also causes the belt to operate at an elevated temperature which tends to promote delamination of the various belt sections and to reduce service life.

SUMMARY

In accordance with the present invention, an improved V-type endless power transmission belt is provided having increased transverse rigidity.

In particular, this invention provides an endless V-type power transmission belt made primarily of elastomeric materials and comprising a tension section, and load-carrying section and a compression section wherein the tension section comprises a plurality of fabric layers bonded together and having a plurality of grooves molded in the outer surface thereof, the grooves being transverse of the endless path of the belt.

It is, therefore, an object of the present invention to provide a V-type endless power transmission belt having increased transverse rigidity.

As an added advantage, it has been found that such a belt is cooler running, thus promoting the service life thereof.

It is another object of this invention to provide a method for producing a V-type endless power transmission belt having increased transverse rigidity.

Other objects, aspects and several advantages of the present invention will be apparent to those skilled in the art from a reading of the detailed specification, the accompanying drawing and the appended claims.

DESCRIPTION OF THE DRAWING

FIG. 1 is a perspective view of a segment of our novel belt, partially in section;

FIG. 2 is a sectional view of the belt segment, taken along lines 2—2 of FIG. 1;

FIG. 3 is a sectional view of another embodiment of the belt of this invention similar to FIG. 2;

FIG. 4 is a sectional view of the assembly of the components of the belt sleeve; and FIG. 5 is a sectional view illustrating a further step in manufacturing the belt sleeve.

DESCRIPTION OF THE PREFERRED EMBODIMENT

Referring now to the drawing, the endless power transmission belt of this invention is designated generally by the reference numeral 2. Belt 2, as shown, is in the form of a toothed or so-called cog-type belt and comprises a top or outer tension section 4, a load-carrying section 6, and a bottom or inner compression section 8. The load-carrying section 6 has a helically-wound load-carrying cord 10 embedded in a tough rubber compound 12. The load-carrying section 6 is bonded on the bottom by the compression section 8 composed of a stiff, fiber-loaded rubber cushion compounded to provide transverse stiffness in the belt; and on the top by the tension section 4 composed of a plurality of layers of rubber-impregnated fabric 14.

The compression section 8 has a plurality of teeth, each designated generally by the reference numeral 16 which are arranged transverse the longitudinal or endless path of the belt 2. The inner surface of each tooth 16 has a rubber-impregnated fabric layer 18, although this layer may be omitted.

The tension section 4 has a plurality of corrugations, each designated generally by the reference numeral 20, which are arranged transverse the endless path of the belt 2. The depth of each corrugation 20 ranges from about 25 to about 50 percent, preferably about 30 percent, of the total thickness of the fabric layers 14 which comprise the tension section 4. In general, the number of layers of rubber-impregnated fabric 14 which comprise the tension section 4 can range from 2 to 10; however, it is generally preferred that the number of such layers 14 range from 4 to 8. At least two of the layers of the fabric 14 generally follow the same convolutions. The rubber-impregnated fabric which constitute the layers 14 and the inner covering 18 can all be the same, or may be formed of various combinations of different types of fabric. For example, the fabric may be square-woven, bias laid; "stress-relieved", which means that the warps and wefts are at an angle of 95° to 155° with each other; or are so-called tire cord fabrics which utilizes a transverse strength cord and a longitudinal weak tie cord.

It is presently preferred that the pitch L, which is the distance between corrugations 20, differ from the pitch P of the teeth 16 in order to reduce the possibility of weak spots in the belt.

The belt of the invention is fabricated by first forming a belt sleeve designated by reference numeral 1 which is formed in a fairly conventional manner by assembling components of the sleeve around a cylindrical forming member or mandrel 24. In order to form the belt described above, the sleeve is assembled, as will be described, vulcanized, and cut into the individual belts generally designated by the reference numeral 2.

FIG. 4 illustrates an assembly whereby a first layer 18 of rubber-impregnated fabric, placed around the mandrel 24, and this is followed by a layer of rubber 8 which is concentrically applied thereto. Thus the fabric 18 and the rubber layer 8 comprise the compression section of the finished belt. As noted above, the compression section may include fibers, generally designated by reference numeral 3 to produce the belt illustrated in FIG. 1. However, the use of this fibrous reinforcement is optional, and in addition, the use of the fabric layer 18 is also optional, as a satisfactory compression section may be formed of the rubber layer 8 alone.

The load-carrying section generally designated by reference numeral 12 is illustrated as being formed by a first layer of rubber 12A around which is applied a continuous strength cord 10 which is placed at right angles to the mandrel in a conventional manner, such as described in U.S. Pat. No. 3,464,875. This is surmounted by a similar layer 12B. The layers 12A and 12B are preferably formed of a tough rubber compound so that they form a cushion for the helical cord, and collectively form the cushion 12. It is also possible to omit the cushion layer and to apply the cord 10 directly around the compression layer 8.

Surmounting the load-carrying section are a number of layers of fabric each designated by reference numeral 14 which form the tension section 4. These may be either separately or continuously wrapped around the load-carrying section so that anywhere from 2 to 10 layers are provided, as indicated above. As previously discussed, each of these layers may be made of a fabric which is bias laid square-woven, stress relieved, or tire cord fabric.

Upon completion of the above assembly an outer cylindrical forming member is placed around the assembly, this forming member having corrugations at its inner surface to form corresponding corrugations in the tension section at right angles to the load-carrying member. This is illustrated in FIG. 5 in which the belt sleeve, or assembly 1, is illustrated without reference to the details of FIG. 4, and the outer forming member 26, which is preferably a reusable rubber matrix is illustrated in a fragmentary manner. Other types of forming members may be used to accomplish the same purpose, namely to create the corrugations in the outer or tension section of the belt sleeve. The entire assembly is then vulcanized in a conventional manner, such as shown, for example, in U.S. Pat. Nos. 2,268,865 or 3,398,218, which results in curing the entire sleeve and in completing the formation of the corrugations in the fabric layers which make up the tension section. The sleeve is then removed and cut into individual belt bodies in a manner well known in the prior art.

The above process which is described and illustrated will result in a belt having a smooth inner surface as shown in FIG. 3, for example, but in order to provide the cogs, or inner corrugations as shown in FIGS. 1 and 2, it is only necessary to make the mandrel 24 in a corrugated shape as shown, for example, in the above-mentioned U.S. Pat. No. 3,464,875. It is also possible to utilize an inner rubber matrix similar to the matrix 26 for this purpose, if desired. The vulcanizing and cutting steps for this type belt, of course, are identical to those previously described.

As shown in FIG. 2, all the layers of fabric 14 follow the convolutions of the corrugated second matrix, thereby providing a belt having increased transverse rigidity in the tension section 4. It can be seen that the total thickness of the fabric layers 14 remains substantially constant, and that the fabric layers 14 are impressed into the tough rubber compound 12 in a corrugated manner during the vulcanization step.

FIG. 3 illustrates another embodiment of the present invention wherein the compression section 8 is plain, i.e., section 8 is not grooved or toothed. The belt shown in FIG. 3 is designated by reference numeral 22 and is formed in a manner similar to the procedure set forth above, except that the inner matrix is omitted. It should be noted that although this embodiment does not illustrate an inner fabric layer similar to layer 18, such a layer may also be included if desired.

The term "rubber" as used herein, and in the claims, is intended to include rubber compositions comprising natural rubber, synthetic rubber and mixtures thereof, as is well known in the art.

The belts described above have a high longitudinal flexibility and at the same time, a high resistance to bending from lateral compression. Additionally, the belt produced according to the present invention is cooler running than similar belts not having the transverse corrugations in the tension section.

It will be apparent to those skilled in the art that various changes and modifications may be made in the above procedure without departing from the spirit or scope of the invention.

We claim:

1. A method for manufacturing an endless V-type transmission belt having an inner compression section, an outer tension section and a load-carrying section positioned between said compression section and said tension section which comprises the steps of; placing a layer of uncured rubber around a first forming member to form a compression section, applying a load-carrying section around said uncured rubber layer, applying a plurality of layers of fabric around said load-carrying member to form a tension section, placing a second forming member around said fabric layers, said second forming member having corrugations in its inner surface and forming corresponding corrugations in at least two of said layers of said fabric in said tension section at approximately right angles to said load-carrying member, vulcanizing the resulting assembly to complete the corrugations, and cutting the vulcanized assembly into a plurality of finished belts.

2. The method of claim 1 wherein said first forming member is cylindrical and has a smooth outer surface.

3. The method of claim 2 wherein said first forming member has a plurality of transverse corrugations in its outer surface.

4. The method of claim 3 comprising the additional step of placing at least one layer of fabric around said first forming member prior to placing said layer of uncured rubber therearound.

5. The method of claim 1 wherein said load-carrying section is formed by helically applying a continuous strength cord under tension around said compression section.

6. The method of claim 1 wherein said load-carrying section is formed by applying a first rubber cushion layer around said compression section, applying a continuous strength cord around said first layer and applying a second rubber cushion layer around said cord.

7. The method of claim 1 wherein the depth of said corrugations including the step of forming said corrugations to a depth of about 25 to about 50 percent of the total thickness of said fabric layers.

8. The method of claim 1 including the step of forming said corrugations to about 30 percent of the total thickness of said fabric layers.

9. An endless V-type transmission belt comprising an inner compression section, an outer tension section and a load-carrying section positioned therebetween, said tension section comprising a plurality of layers of fabric having molded corrugations transverse of the endless path of said belt wherein at least two of said layers of said fabric generally follow the same convolutions.

10. The belt of claim 9 wherein said compression section comprises a fiber-loaded rubber cushion compound, the fibers in said compound being oriented in a direction generally transverse to the endless path of said belt.

11. The belt of claim 9 wherein said load-carrying section comprises a helically-wound continuous cord embedded in a rubber compound.

12. The belt of claim 9 wherein said tension section has from 2 to 10 layers of said fabric.

13. The belt of claim 9 wherein said tension section has from 4 to 8 layers of said fabric.

14. The belt of claim 9 wherein the depth of said corrugations in said tension section ranges from about 25 to about 50 percent of the total thickness of said fabric layers.

15. The belt of claim 9 wherein the depth of said corrugations in said tension section is about 30 percent of the total thickness of said fabric layers.

16. The belt of claim 9 wherein said compression section has transverse cogs formed therein.

17. The belt of claim 9 in which the inner surface of said compression section is formed by at least one layer of fabric.

18. The belt of claim 9 in which one or more of said fabric layers is selected from the group comprising square-woven bias laid fabric, stress-relieved fabric, and tire cord fabric.

19. The belt of claim 9 in which said layers are comprised of tire cord fabric.

20. The belt of claim 9 in which said layers are comprised of stress-relieved fabric.

* * * * *